United States Patent [19]

Johnson

[11] 4,345,290

[45] Aug. 17, 1982

[54] ELECTRICAL TRANSIENT SUPPRESSOR

[76] Inventor: Richard H. Johnson, 3401 White Diamond, Prior Lake, Minn. 55372

[21] Appl. No.: 189,607

[22] Filed: Sep. 22, 1980

[51] Int. Cl.³ .......................................... H02H 3/20

[52] U.S. Cl. .......................................... 361/56; 361/91; 361/118; 361/119; 175/52

[58] Field of Search .................. 361/56, 119, 118, 91, 361/111, 110, 127, 126, 125, 380, 434; 174/52 PE, 52 S, 52 R, 52 H, 52 P; 338/21, 20

[56] References Cited

U.S. PATENT DOCUMENTS

| | | | |
|---|---|---|---|
| 2,720,617 | 10/1955 | Sardella | 174/52 PE |
| 3,486,084 | 12/1969 | Zido | 174/52 PE |
| 3,890,543 | 6/1975 | Jonassen | 361/56 |
| 3,894,274 | 7/1975 | Rosenberry | 361/56 X |
| 4,039,904 | 8/1977 | Klein et al. | 174/52 PE |
| 4,089,032 | 5/1978 | Orfano | 361/56 |

*Primary Examiner*—Patrick R. Salce

*Attorney, Agent, or Firm*—Donald A. Jacobson

[57] ABSTRACT

Apparatus for clipping excessive voltage transients in an alternating current power distribution system to protect the electrical system and attached electrical equipment from damage or failure due to said excessive high voltage transients and surges. Varistors are connected from each electrical phase to grounded conductor, referred to as neutral hereafter and also from neutral to ground to provide an additional fail-safe feature. This electrical circuit is contained within a cylindrically shaped hollow enclosure made of a high impact, polypropolene plastic. A plastic potting compound seals all the voids within the enclosure for additional electrical insulation. One end of the cylindrical enclosure terminates in a cap using rounded threads made of the same material as the cylinder which provides access for the circuit. The rounded threads provide protection against overtightening the cap. The opposite end has a threaded extension which mates with a standard electrical knockout and electrical lock nut for mounting. The cylinder, adjacent the body of the extension, is concave to enclose an O-ring or gasket to assist in sealing when mounted on an electrical junction or switchbox.

12 Claims, 5 Drawing Figures

ELECTRICAL TRANSIENT SUPPRESSOR

BACKGROUND OF THE INVENTION

I. Field of the Invention

This invention relates generally to electrical transient suppression apparatus which utilizes varistors connected from each electrical phase to neutral as well as a varistor connected from electrical neutral to ground to protect the electrical system and connected equipment from high voltage transients and surges. A protective case, made of high impact plastic having good insulation properties, protects this electrical circuit. The protective case is devised to assist in assembly, to provide a support for potting the electrical circuit, to seal readily to standard electrical circuit boxes and to protect the wires.

II. Description of the Prior Art

There are a number of transient suppression circuits which address the problem of apparatus and equipment protection from high voltage transients and surges.

In U.S. Pat. No. 3,546,572, Specht et al varistors in parallel with capacitors are connected only from each phase leg to neutral as clamping devices to suppress high voltage surges. In U.S. Pat. No. to De Cecco et al, 3,947,726, varistors in series and in parallel with other circuit elements are used as a surge-energy dissipating process. These patents are representative of the prior art.

No prior art known to me provides the combination of the attributes of the present invention, namely, varistor protection, not only between each electrical phase and neutral, but also between the neutral and ground circuits with the circuits in a protective insulated container capable of meeting the explosion-proof, waterproof and acid-proof requirements of the National Electrical Code and capable of being connected and sealed readily to existing standard electrical circuit boxes with an enclosure devised to permit potting, providing wire protection and automatic strain-relief during assembly.

SUMMARY OF THE INVENTION

The present invention is concerned with the protection of electrical powered systems of the end electrical user by the employment of a varistor from each electrical phase to neutral and from neutral to ground, and the mechanical protection and insulation of each circuit.

Prior approaches have demonstrated the value of the use of a varistor in the protection of electrical systems from voltage surges which are induced by the connection and disconnection of large electrical loads of the user's equipment or of equipment of other users which are coupled into the user's electrical circuits by common transformers and primary electrical circuits.

The instant invention introduces an increased degree of stability in the user's voltages by suppressing any transients between the phase voltage and the neutral and between neutral and ground circuits by the use of a varistor connected between these two circuits. The prior art has disclosed that a varistor, which has the characteristic of changing its electrical impedance from a relatively high to a relatively low value whenever a certain voltage is exceeded, will protect against electrical transients which exceed normal operating levels. Selecting a breakdown voltage which is higher than the normal supply voltage will thus provide protection against transients and surges with no interference with the normal operation of the equipment.

Elimination of such surges is important because many solid-state circuit elements are highly voltage sensitive. In addition, the reductions of the physical size of electrical motors by the use of thinner insulation on the wire used in field and armature windings has increased proportionately the amount of transient overvoltage which can puncture the insulation.

A number of circuit conditions will induce high transient voltage between neutral and ground circuits. A fault current from an electrical phase leg to a neutral circuit will cause a voltage difference between the neutral circuit and the ground circuit equal to the fault current times the electrical impedance between the two circuits. For a large fault current, this voltage difference will also have the effect of shifting all electrical phases a similar amount above current potential. Quite often, a three-phase motor will have no neutral circuit, and this increased voltage from the phase legs to ground can result in a puncture of the insulation in the electrical windings since the motor frame is usually tied directly to ground potential by means of a grounding strap or wire.

The electrical elements are mounted and potted in a hollow plastic container to provide both electrical insulation and mechanical protection. The mechanical protection is adequate to protect the electrical elements external to the circuit boxes and provides a conventional mounting attachment using an electrical knockout hole.

These problems have not been addressed by previous apparatus and can result in an excessive failure rate of users' electrical equipment.

Electrical transient suppression equipment can be used in the full spectrum of domestic, commercial and industrial applications. The space available within existing circuit breaker boxes, fuse boxes and motor controllers is typically at a premium. The cost of replacing existing junction or switch boxes to install transient suppression equipment can be sizeable. The instant invention, with the exception of attachment wires, is mounted externally and therefore requires no internal volume.

The instant invention encloses the electrical circuitry within a hollow plastic container made of polypropylene plastic, or similar material, which is resistant to mechanical stress and also provides insulation to the exterior environment. The container has a circular hollow, externally threaded extension which carries the circuit connection wires and which can fit into standard diameter electrical knockouts and mate with a standard electrical lock nut for that diameter hole.

The interior cross-section of the threaded extension varies gradually along its length, being of a minimum dimension on each end and having a rounded lip. This provides protection for the connection wires to the circuit in that no sharp edges are presented to the wires.

A circular opening in the container wall, roughly opposite the threaded extension, provides an access for inserting the electrical circuit within the container. The circular opening has an interior thread which mates with threads on a matching plug which is made of the same material as the container. These threads have a semi-circular root to provide automatic strain-relief during assembly. Any tightening of the plug will cause the thread to disengage because of the rounded root, and to re-engage on the next outer thread on the plug.

This disengagement does not damage the threads and provides an automatic strain-relief to prevent any damage to the threads in the circular opening or on the plug during assembly.

A groove is molded into the interior surface of the plug and a similar groove is molded into the interior surface of the hollow plastic container. The purpose for these grooves will be discussed later.

Electrical protection is provided by using a varistor from each phase leg to a common point and a varistor from the common point to electrical ground. The varistor common point is connected to the power circuit to electrical neutral. The varistors for the phase legs have a breakdown voltage rating which is approximately 25 percent higher than the phase voltage. The varistor from neutral to ground has a breakdown voltage rating which is approximately four times the phase voltage.

A number 12 stranded wire using THHN insulation is soldered to each varistor on the lead opposite the common point. After soldering, the parts are folded to minimize the cross-section of the circuit and then the entire circuit is dipped into the liquid 3M product, Scotch Coat, or equivalent. This plastic compound coats all of the circuit and provides high electrical insulation between all of the circuit elements and the soldered connections. This coat is allowed to harden, then the electrical circuit is inserted into the container by first threading the connection wires into the circular opening in the container wall and then through the opposing hollow extension. The electrical circuit is then inserted fully within the container. The leads used are stranded with relatively heavy #12 gage wire and thick THHN insulation which tends to bear against the walls of the container which automatically centers and spaces the circuit elements evenly. The plastic plug is then screwed tightly in place in the circular opening.

The container is then oriented with hollow threaded extension uppermost and the interior filled with a potting compound such as the 3M product, Scotchcast 4, or equivalent. After this potting compound has set, the assembly operation is complete. The polypropylene plastic used for the container and plug does not adhere readily to any material including the potting compound. The grooves in the plug and the container filled with the potting compound cannot be rotated with respect to each other without shearing the enclosed potting material and act as a lock to prevent removing the plug.

It is possible, where space is not limited, to install this device within the circuit boxes because of the complete electrical insulation and protection of all the circuit elements. The device can be mounted upon an "L" shaped bracket or simply laid within the electrical box as mounting is not required by electrical code.

The use of the plastic material for the container and the plug permits using different colors for each as circuit identifiers. The convention selected will be discussed later.

DESCRIPTION OF THE PREFERRED EMBODIMENT

Figure 1:
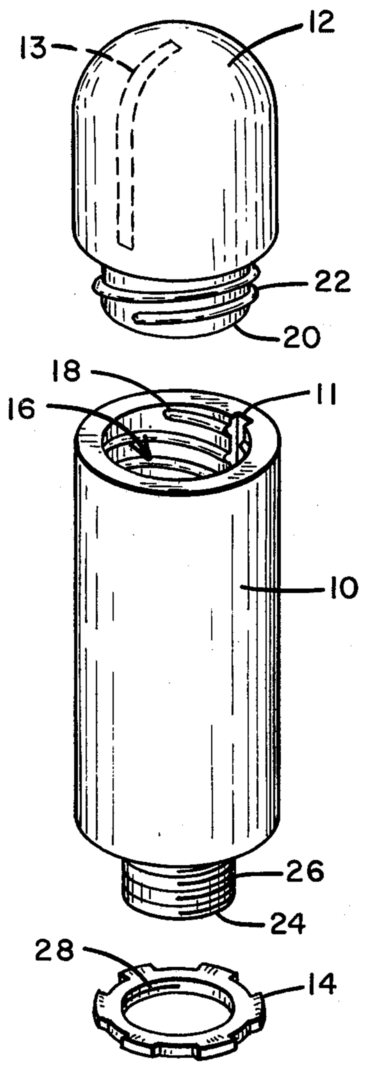
FIG. 1 is a perspective exploded side view of the protective container, cap and electrical lock nut.

Referring to FIG. 1, a container 10, a hollow cap 12 and a standard electrical lock nut 14 are illustrated. The container 10 and cap 12 are of approximately the same diameter and are made of polypropylene or similar high impact electrical insulating plastic, and cap 12 has a color added to the plastic material as circuit identification. The convention selected will be discussed later. Container 10 has a cylindrically shaped hollow interior 16 which extends from the top to near the bottom of said container. Recessed threads 18 are molded into the upper end of container 10 about circular opening 16, along the longitudinal axis of the cylinder, said threads having a semi-circular shaped root rather than the conventional triangular shaped thread root. Cap 12 has a cylindrically shaped extension 20 which is slightly smaller than the diameter of hollow interior 16. External threads 22 project from extension 20 which have a semi-circular cross-section of a proper size to mate with interior threads 18.

A cylindrical shaped hollow extension 24 projects from container 10 opposite opening 16. Extension 24 has threads 26 molded into the exterior sides of extension 24 both of the proper size and shape to mate with matching threads 28 on a conventional lock nut 14.

Figure 3:
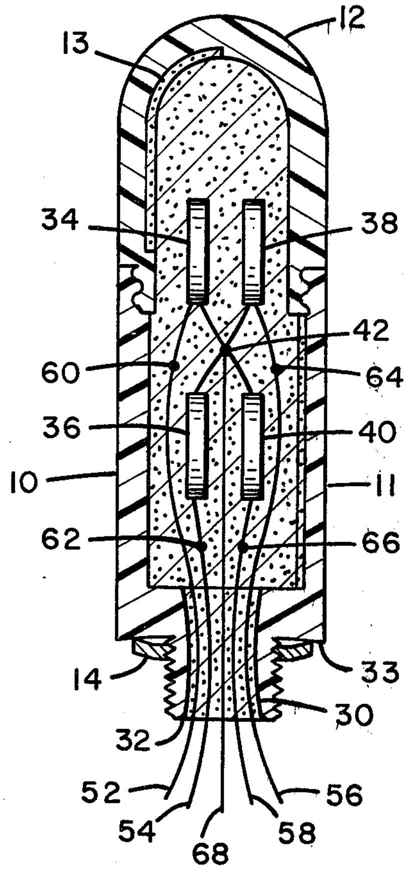
FIG. 3 is a cross-section side view of a completely assembled transient suppressor for a three-phase circuit.

Extension 24 has a circular interior opening 30 along its entire axis which is shown in cross-section in FIG. 3. Opening 30 has a maximum diameter on each extreme end of extension 24 which tapers to a minimum diameter in the middle and rounded lips 32 at its outer extremity. These items are shown in greater detail in FIG. 4. The washer shaped area 33 of container 10 adjacent extension 24 has a concave cross-section. The purpose for the shape of opening 30 and the concave cross-section will be discussed later.

An interior groove 13 is molded into the inner surface of cap 12 perpendicular to the base from one edge of the base through the top to the opposite edge of the base. An interior groove 11 is molded into the interior surface of container 10 on one wall parallel to the longitudinal axis of the interior cylinder from the top to the bottom of the interior. The purpose for these grooves will be explained later.

Figure 2A:
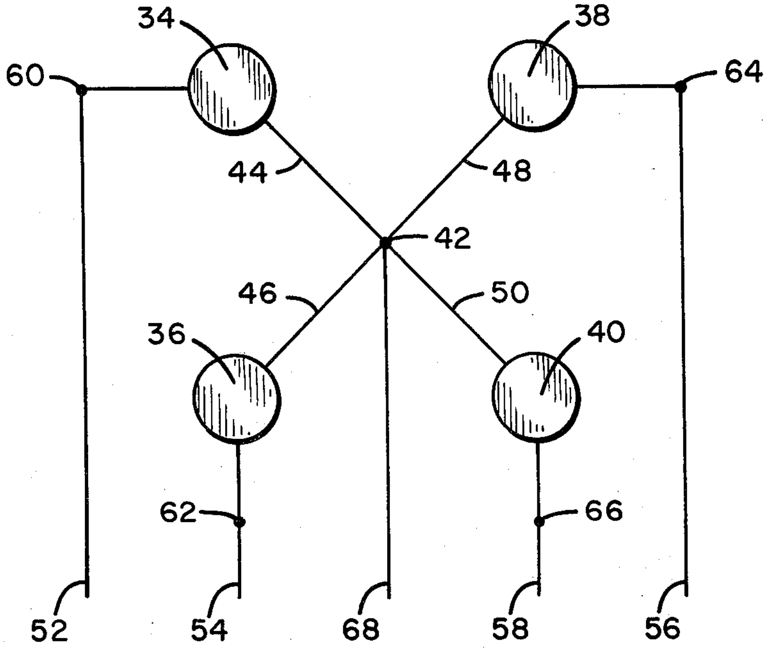
FIG. 2A illustrates the electrical circuit connections for a three-phase transient suppressor.

The electrical circuits required for all conventional three-phase electrical power in use in the United States are all illustrated in FIG. 2A but using different varistor ratings. In this circuit four varistors 34, 36, 38 and 40 are connected to a common point 42. For all circuits the varistors are General Electric metal oxide models of the ratings given, or equivalent. One lead 44, 46, 48 and 50 of the respective varistors are soldered together at a common point 42. Wires 52, 54, 56 and 58 are stripped on one end for approximately ½ inch and the stripped end soldered to the second lead of the respective varistors at points 60, 62, 64 and 66, respectively. Wire 68 is similarly stripped and the stripped end soldered to common point 42. All said wires are stranded #12 electrical gage with THHN insulation and are approximately 18 inches long.

When this circuit is used for 120/208 volts alternating current three-phase power, the wires 52,54 and 56 are connected to phase A, B and C of the three-phase circuit, respectively. Wire 68 is connected to the electrical neutral and wire 58 is connected to the electrical ground. Varistors 34, 36 and 38 are Model V150 LA 20A, varistor 40 is Model V575 LA 40A.

When this circuit is used for a 240 volt alternating current three-phase delta circuit having a high leg, the varistor ratings are changed accordingly. Making the high leg connection to wire 58 with the other voltage sources to wires 52 and 54, neutral to 68 and ground to 56 then, varistors 34 and 36 are Model V150 LA 40A and varistor 38 is Model V575 LA 40A and varistor 40 is Model V250 LA 40.

When this is used with a 277/480 volt alternating current three-phase power source the varistor ratings are again changed. The varistors 34, 36 and 38 are Model V320 LA 40A and varistor 40 is Model V320 LA 40A. Phase legs A, B and C are connected to wires 52, 54 and 56, respectively. Wire 68 is connected to neutral and wire 58 to ground. If no neutral circuit is used then wire 68 can either be cut off or an electrical wire nut can be screwed over the end of the wire for insulation.

Figure 2B:
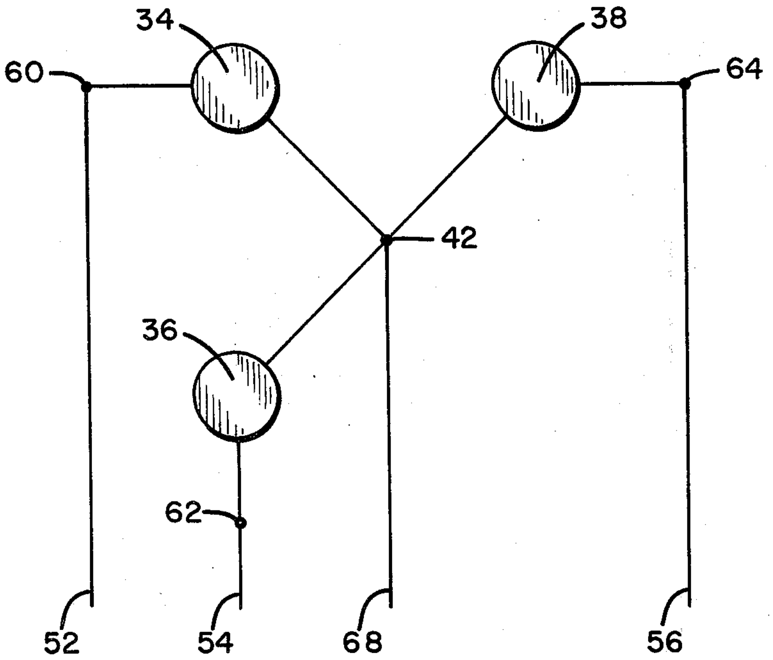
FIG. 2B illustrates the electrical circuit connections for a single-phase circuit transient suppressor.

The circuit in FIG. 2B is used with a 120/240 volt alternating current single phase power source. The only difference between this circuit and circuit 2A is the omission of varistor 40 and wire 58 and the ratings of the varistors. Wire 52 is connected to one of the 120 volt single phase lines, and wire 54 is connected to the opposite 120 volt line. Wire 68 is connected to neutral and wire 56 is connected to ground. The varistors used for this circuit are Model V150 LA 20A for 34 and 36, and Model V575 LA 40A for 38.

After the soldered connections in FIG. 2 or 2B are completed, the varistors 34 and 38 and varistors 36 and 40 are folded together. The resulting cross-section of these varistors for FIG. 2A is that shown in FIG. 3. This folding minimizes the cross sectional shape of the overall circuit while still retaining spacing between the electrical elements.

The entire electrical circuit is then dipped into a liquid insulating 3M product, Scotch Coat, or equivalent. This provides insulation for all soldered joints and all exposed metal parts of the circuit.

After the dip has solidified, the leads 52, 54, 56, 58, and 68 of the electrical circuit are inserted into the hollow interior 16 of container 10 until said leads project from opening 30 as shown in FIG. 3. Cap 12 is then screwed into container 10 with threads 22 engaging threads 18. If cap 12 is overtightened on container 10 then rounded threads 22 will slip out from threads 18 preventing damage to the threads.

After cap 12 is attached, container 10 is oriented with extension 24 upmost. The voids in the container 10, cap 12, and extension 24 are then filled with the liquid potting compound, 3M Scotchcast 4, or equivalent. The interior of extension 24 is filled to the approximate top of the extension. When the potting compound has set, the assembly operation is complete.

The potting compound fills grooves 11 and 13 in container 10 and cap 12, respectively, and thereby locks the two parts one to the other. Any attempts to unscrew cap 12 from cap 10 requires shearing the potting compound within grooves 11 and 13 from the compound and the remainder of the enclosure.

Figure 4:
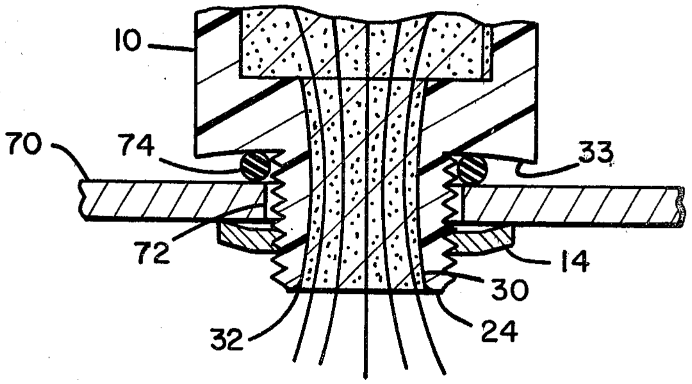
FIG. 4 is a cross-section fragmentary detail of FIG. 3 illustrating the mounting of the transient suppressor on an electrical circuit box.

In FIG. 4 the cross-section 70 of a side wall of a circuit box is illustrated. Container 10 is mounted on the outside of said box with extension 24 extending through a hole 72 in cross-section 70 created by the removal of a knock-out in the circuit box and O-ring 74 is mounted around extension 24 adjacent concave surface 33 and the cross-section 70 of the side wall of the circuit box. Lock nut 14 is screwed tightly onto threads 26 thus drawing extension 24 through hole 72 and compressing O-ring 74 within the cavity formed by concave surface 33 and the circuit box. This results in a waterproof, dust-proof, and explosive-proof seal.

Mounting this circuit external to the box results in a requirement for very little volume within the box, namely the extension of wires 52, 54, 56, 58 and 68 and connectors necessary to attach said wires to the appropriate circuits. This small additional volume requirement can ordinarily be provided by the usual circuit box which permits this circuit to be added without necessitating any extensive change of circuit boxes which would otherwise be necessary if the circuit were mounted within the box proper.

The integrity of the insulation permits installing this device within an electrical circuit box either on an "L" shaped bracket or merely lying loosely within the box.

The construction, assembly and mounting of this device for all electrical circuits is the same regardless of the voltage ratings and whether the circuit is single phase or three phase. The color of the cap is used as a circuit identifier as follows: blue, 120/208 volt three phase; orange, 240 volt three phase high leg delta; red, 277/480 volt three phase; yellow, 120/240 volt single phase. Color coding can also be used to identify the individual wire connections.

The addition of a varistor from neutral to ground greatly reduces the possibility of damage to electrical devices connected to the supply circuits.

This protected circuit can be used in any environment with no additional protection being required. This is particularly important when the environment is filled with dust, explosive gasses or water. The fact that only a standard electrical knock-out hole and lock washer are required to mount the circuit external to any electrical box, greatly simplifies the use of this circuit in any existing installation.

Although specific instruction of the herein disclosed circuit has been shown and described, it is obvious that those skilled in the art may make various modifications and changes to them without departing from the scope and spirit of the present invention. It is to be expressly understood that the instant invention is limited only by the appended claims.

What is claimed is:

1. An electrical circuit for limiting high voltage transients in an alternating current voltage supply circuit of the type having a common neutral and an electrical ground comprising:

a. A number of first varistors connected to a common point and to each voltage leg of said voltage supply circuit, said varistors having a breakdown voltage rating of a predetermined value in excess of said voltage supply nominal value;

b. An electrical connection from said common point to said common neutral;

c. A further varistor connected from said common neutral to said electrical ground of said voltage supply circuit, said further varistor having a breakdown voltage rating of a predetermined value substantially in excess of said voltage supply nominal value; and d. Encapsulating means for protecting said electrical circuit from the environment, said encapsulating means including:

i. a relatively thin insulative coating formed on said number of first varistors and said further varistor and said common point;

ii. a hollow enclosure member having a first opening through a wall of said enclosure, and a generally tubular, cylindrical extension projecting outwardly from said wall and in alignment with said first opening, said first opening having semicircular internal thread means formed therein, said extension also having thread means formed on the external surface thereof and a recess through the interior surface thereof forming a second opening in said hollow enclosure;

iii. a cap member having a cylindrical portion of a diameter dimension to fit within said first opening and having a semicircular external thread means thereon for engaging said thread means in said first opening, said cap having a recess formed in an interior surface thereof; and iv. an insulative potting compound contained within said enclosure filling said recesses in said enclosure and cap member and surrounding said circuit.

2. The device as in claim 1 wherein said tubular extension has a rounded lip formed in the interior wall proximate its end.

3. The device as in claim 1 wherein said housing has an annular concave recess surrounding said tubular extension.

4. The device as in claim 1 wherein said tubular cylindrical projection has a convex curved surface extending axially and formed on the interior of said tubular projection.

5. The device as in claim 1 wherein said hollow enclosure member is substantially cylindrical in shape and wherein said first and said second opening are aligned with the axis of said cylinder.

6. The device as in claim 5 wherein said cap is substantially dome shaped with a hollow interior containing said interior recess.

7. Encapsulation means for protecting an electrical circuit from the environment, said electrical circuit consisting of a number of discrete electrical components connected electrically by connection means, said encapsulating means comprising:

a. a relatively thin insulative coating formed on said components and said connections;

b. a hollow enclosure member having a first opening through the wall of said enclosure, and a generally tubular cylindrical extension projecting outwardly from said wall and in alignment with said first opening, said first opening having semicircular internal thread means formed therein, said extension also having thread means formed on the external surface thereof and a recess through the interior surface thereof forming a second opening in said hollow enclosure;

c. a cap member having a cylindrical portion of a diameter dimensioned to fit within said first opening and having a semicircular external thread means thereon for engaging said thread means in said first opening, said cap having a recess formed in an interior surface thereof; and d. an insulative potting compound contained within said enclosure filling said recesses in said enclosure and cap member and surrounding said circuit.

8. The device as in claim 7 wherein said tubular extension has a rounded lip formed in the interior wall proximate its end.

9. The device as in claim 7 wherein said housing has an annular concave recess surrounding said tubular extension.

10. The device as in claim 7 wherein said tubular cylindrical projection has a convex curved surace extending axially and formed on the interior of said tubular projection.

11. The device as in claim 7 wherein said hollow enclosure member is substantially cylindrical in shape and wherein said first and said second opening are aligned with the axis of said cylinder.

12. The device as in claim 7 wherein said cap is substantially dome shaped with a hollow interior containing said interior recess.

* * * * *